May 20, 1941.  P. B. MARTIN ET AL  2,242,314
CONTROL DEVICE FOR AIRCRAFT
Filed Oct. 15, 1937  2 Sheets-Sheet 1
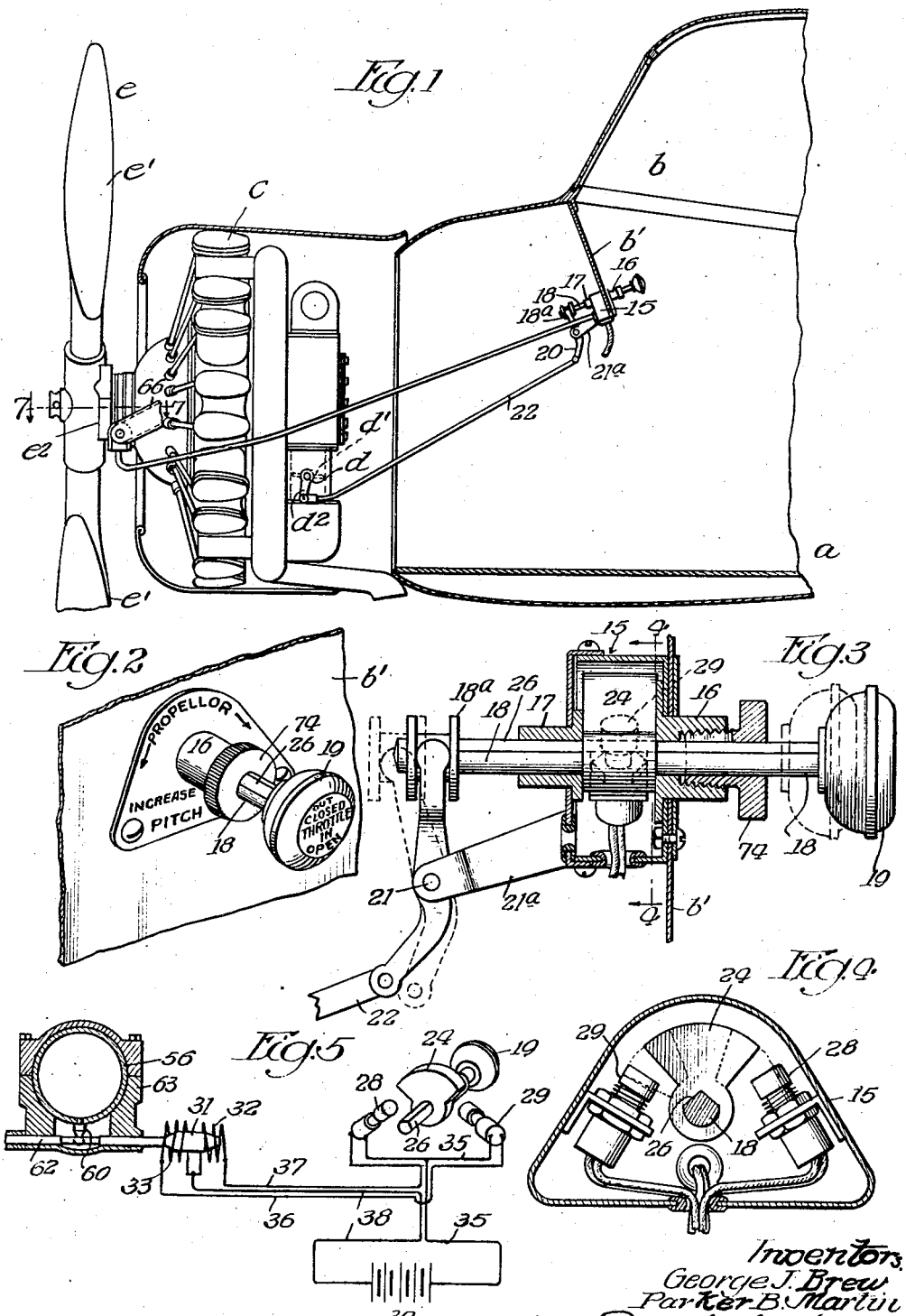

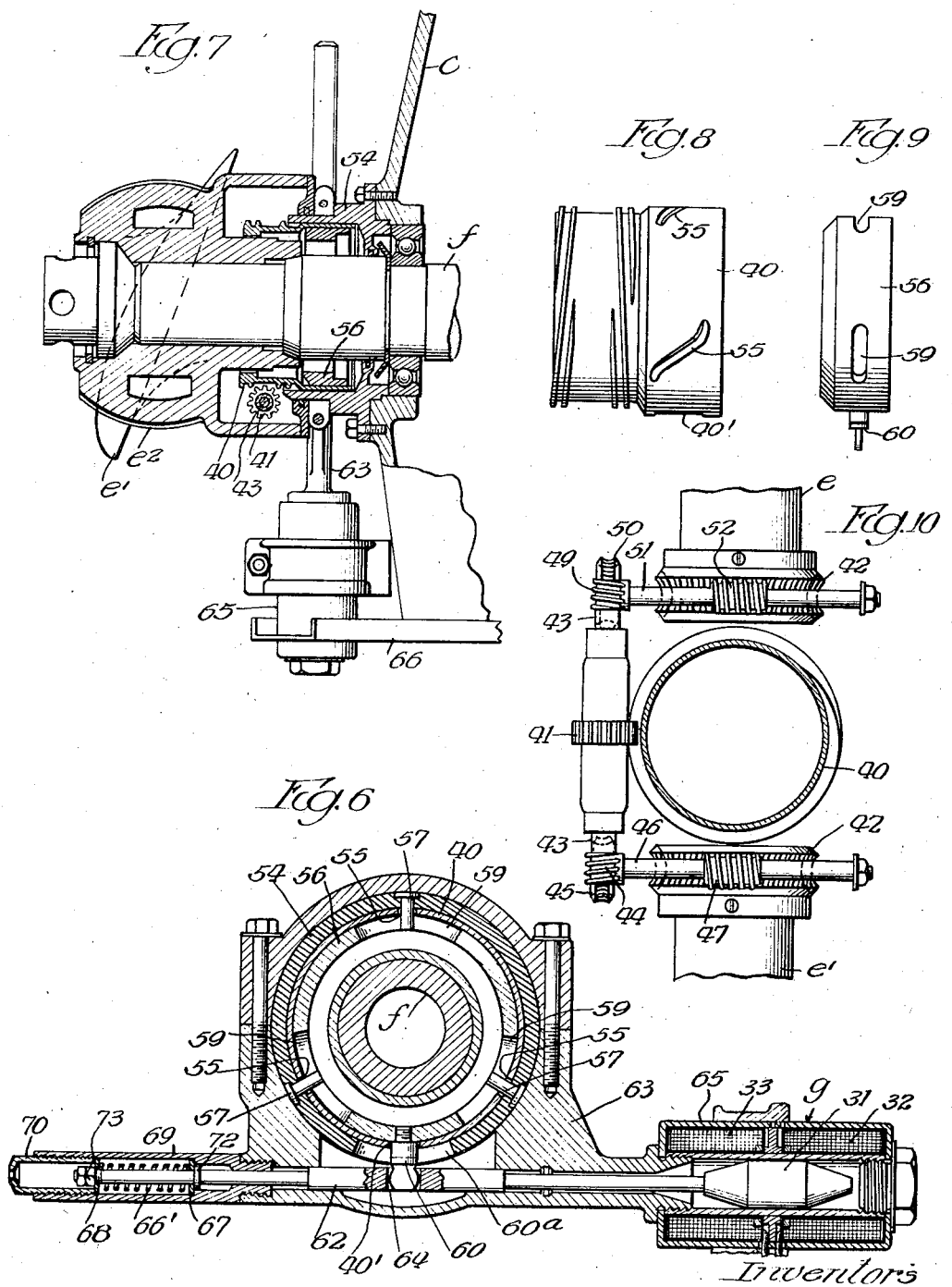

Patented May 20, 1941

2,242,314

UNITED STATES PATENT OFFICE 2,242,314

CONTROL DEVICE FOR AIRCRAFT

Parker B. Martin and George J. Brew, Williamsport, Pa., assignors to Aviation Manufacturing Corporation, Williamsport, Pa., a corporation of Delaware Application October 15, 1937, Serial No. 169,127

4 Claims. (Cl. 170—135.6)

The invention relates to controlling devices for airplane engines and the pitch of propellers of airplanes.

In airplanes equipped with manually controlled pitch-change mechanism for the propeller-blades and a manually controlled throttle for controlling the speed of the internal combustion engine for driving the propeller, it is desirable to independently control the pitch-change mechanism and the speed of the engine and propeller driven thereby, for relatively varying the pitch of the blades and their speed of rotation during the taking-off or landing periods. The pilot is engaged at these times in manipulating the control surface of the airplane to safely maneuver it so that rapid manipulation of the controls for the engine and the pitch-changing mechanism is necessary at these times which is apt to require attention at a time when his skill and attention must be devoted to safe landing or taking off of the airplane. It is generally recognized that the great number of control-devices which the pilot is required to operate at these times constitutes a handicap to the pilot in reaching for them and that they should be positioned so that there is no possibility of error or inadvertently catching wearing apparel or equipment in them. Combined automatic or manual controls which simultaneously operate the pitch-changing mechanism and the engine, as heretofore proposed, do not provide for independent or relative variation of the pitch-changes and the engine-speed while in flight, as is frequently necessary in safely taking off or landing the airplane.

One object of the invention is to provide an improved pilot's control-device by which he may manually manipulate, with the same hand, the engine speed-control and the pitch-control, independently of each other or may simultaneously operate both of the controls while grasping a single handle.

Another object of the invention is to provide a pilot's control-device with a differentially-movable handle by which the pilot may independently or relatively control pitch-changes of the propeller-blades and the engine-speed, thus making it possible to vary the pitch without varying the engine-speed or vice versa, by grasping a single device or handle.

Another object of the device is to provide a combined throttle and pitch-control device which is simple in construction and can be conveniently and easily manipulated by the pilot.

Other objects of the invention will appear from the detailed description.

The invention consists in the several novel features which are hereinafter set forth and are more particularly defined by claims at the conclusion hereof.

In the drawings: Fig. 1 is a longitudinal section of the pilot's cab, engine and propeller of an airplane embodying the invention, parts being shown in elevation. Fig. 2 is a perspective of the pilot's control-handle for the pitch-change gearing and the engine-throttle. Fig. 3 is a longitudinal section through the pilot's control-device. Fig. 4 is a section on line 4—4 of Fig. 3. Fig. 5 is a diagram of the electrical connections controlled by the pilot's control-handle for the pitch-change mechanism. Fig. 6 is a transverse section illustrating the electromagnetic means for controlling the pitch-change mechanism. Fig. 7 is a section on line 7—7 of Fig. 1. Fig. 8 is a detail of the collar for engaging the pitch-change mechanism to adjust the propeller-blades. Fig. 9 is a detail of the internal shifting-ring for the collar. Fig. 10 is a diagrammatic view of the gear for rotating the propeller-blades on their longitudinal axes for pitch-variation.

The invention is exemplified in a single motored airplane which comprises a fuselage $a$, a pilot's cab $b$ equipped with an instrument-panel $b'$, a radial internal combustion engine $c$ equipped with a carburetor $d$ comprising a throttle $d'$ to the shaft of which a shifter-arm $d^2$ is attached for setting the throttle in different positions to control the speed of the engine, a propeller-shaft $f$ driven by the engine and a propeller $e$ equipped with blades $e'$ which are rotatable in the propeller-hub $e^2$ on their longitudinal axes for pitch-variation and mechanism operable by power from the propeller-shaft for rotating the blades for pitch-variation.

An example of pitch-change mechanism usable with the invention comprises a collar 40 which surrounds the propeller-shaft and is provided with right-hand and left-hand worms which are normally disengaged from and are selectively engageable, upon axial movement of the collar, with a gear 41 which, upon rotation in one direction by one of the worms, will drive gear 41 of the pitch-change gearing to increase the pitch of the blades and upon rotation in the opposite direction will operate the gearing to decrease the pitch of the blades. The gearing in the hub $e^2$ between gear 41 and the blades $e'$, comprises: a worm-gear 42 on the shank of each propeller-blade; a shaft 43 driven by gear 41 and adapted to drive a worm 44 which engages a worm-gear 45 on a shaft 46 which is provided with a worm 47 which engages and is adapted to rotate the worm gear 42 on one of the propeller-blades; and a second worm 49 which is driven by shaft 43 and engages a worm-gear 50 on a shaft 51 which is provided with a worm 52 engaging the worm-gear 42 on the other propeller-blade. All of this gearing is normally stationary in, and rotates unitarily with, the hub. The collar 40 is held against rotation and when it engages gear 41, one of the worms on the collar will drive the pitch-change gearing when the propeller is revolving. The collar 40 is shiftable by ring 56 from its neutral position, in which it is disengaged from gear 41, to bring either of the worms on said collar into mesh with gear 41 or back to neutral position. Collar 40 is slidably and rotatably mounted in a sleeve 54 which is fixed to the front of the engine-frame or casing. Three radial pins 57 are fixed in sleeve 54 and extend through helical slots 55 in collar 40. A ring 56 is internally mounted in collar 40, is rotatable therein and is held against longitudinal movement by pins 57 which extend into circumferential slots 59 in the ring. A shifter-arm or stud 60 is fixed to ring 56 and extends through a longitudinal slot 40' in collar 40 and a circumferential slot 60ª in sleeve 54. When arm 60 is rotated in one direction, it will rotate collar 40 and ring 56 and helical slots 55 will move said collar longitudinally from its neutral position to engage one of the worms on said collar with gear 41 and drive the pitch-change mechanism so it will increase the pitch of the blades. When arm 60 is shifted in the opposite direction the same means will shift collar 40 longitudinally in the opposite direction to engage the other worm on collar 40 and gear 41 and drive the pitch-change mechanism so as to decrease the pitch of the blades. This exemplifies power-operable means for varying the pitch of the blades.

Arm 60 on ring 56 is rotatable by a rod 62 which is slidably mounted in a bracket 63. Rod 62 is mounted to slide transversely of the propeller-axis in the lower portion of bracket 63 which is formed of semicircular sections and supported from and mounted around the sleeve 54. Arm 60 extends through a slot 64 in rod 62. A solenoid magnet $g$ for electrically shifting rod 62 to operate collar 40, comprises an armature 31 fixed to one end of rod 62, a helix 32 for shifting the armature in one direction, and a helix 33 for shifting it in the opposite direction. This magnet is supported in a casing 65 which has one of its ends secured to a lateral projection of bracket 63 and also a bracket 66 secured to the engine-housing. A compression-spring 66' serves to hold the armature 31 in, and retract it to, its neutral or normal position when the helices 32, 33 are de-energized. This spring is interposed between stop-rings or washers 67, 68 which normally engage, respectively, a shoulder in a sleeve 69 and a shoulder in a cap 70 which is screw-threaded into the end of said sleeve. Sleeve 69 is secured in and projects transversely from the side of bracket 63 opposite to that on which the magnet $g$ is carried. Rod 62 has fixed thereto a shoulder 72 for engaging ring 67 and a nut 73 on the rod is adapted to engage ring 68. Rod 62 is slidable through rings 67, 68, respectively, when the rod 62 is shifted in opposite directions by the magnet $g$. Shoulder 72 will engage washer 67 and compress spring 66' so the ring 56 and collar 40 will be returned to neutral position when the magnet 33 is de-energized. When rod 62 is shifted in the opposite direction by magnet 32, nut 73 will engage ring 68 and compress the spring 66' so that the latter will retract the armature, ring 56 and collar 40 to their neutral position when the magnet 32 is de-energized. This exemplifies electromagnetic means for controlling the pitch-change means.

The improved control-device comprises a sectional casing or box 15 which is secured to the back of the instrument-panel $b'$, a front bearing 16 and a rear bearing 17 secured in the casing; a shaft 18 slidable and rotatable in said bearings and extending through and projecting beyond the bearings; and a handle 19 fixedly secured to the end of the shaft 18 in the pilot's cab and whereby the shaft may be slidably and axially shifted in the bearings and rotated.

The inner end of shaft 18 has fixed thereto an annularly-grooved collar 18ª which is rotatable and slidable with the shaft. The connection for shifting the throttle by manipulation of the handle 19 comprises a lever 20 which is fulcrumed at 21 on a bracket 21ª fixed to the casing 15 and has a fork fitting in the annular groove in collar 18ª so that longitudinal or sliding movement of shaft 18 will rock lever 20 about its fulcrum while rotation of handle 19 will not impart any change of position to lever 20. Said lever is connected by means of a link or rod 22 to the distal end of arm $d^2$ on the throttle-shaft. In and out movements of handle 19 by the pilot will slide or axially shift shaft 18. Inward movement of handle 19 and shaft 18 will, through collar 18ª, lever 20 and link 22, shift the throttle-arm $d^2$ to open the throttle-valve and increase the speed of the engine and the propeller $e$. Outward movement of handle 19 and shaft 18 will, through the same connection, shift throttle-arm $d^2$ to reduce the throttle-opening and decrease the speed of the engine and the propeller driven thereby.

The means for manually controlling the operation of the pitch-change means by the pilot, is operable by the rotative movements of the same handle through which the pilot shifts the throttle to vary the engine and propeller speed. The means for controlling the pitch-change means comprises an arm or cam 24 and a pair of switches 28, 29. Arm 24 is confined in casing 15 against axial movement between bearings 16, 17 and shaft 18 extends through, and is slidable in, arm 24, so that axial movement of the shaft will not change the position of arm 24. Shaft 18 is provided with flat surfaces 26 and the opening in arm 24 conforms to the cross-sectional shape of the shaft so that the arm will rotate with the shaft. Rotative movement of handle 19 will rotate arm 24 without changing the position of the connection for shifting the throttle. Switches 28, 29 are of any suitable type, usually actuated by springs adapted to hold them normally open. These switches are mounted in casing 15 at the opposite sides of shaft 18 and the operating-member of switch 29 is adapted to be engaged by arm 24 when handle 19 is rotated to the left to close a switch for controlling the pitch-change mechanism to increase the pitch of the propeller-blades. Switch 28 is operable by arm 24 when handle 19 is rotated to the right to control a circuit for rendering the pitch-change means operative to decrease the pitch of the propeller-blades.

One contact of switch 28 is connected, by wire 36, to the helix 33 of magnet $g$ and one contact of switch 29 is connected, by wire 37, to helix 32 of magnet $g$. A battery 34 is connected by wiring 35 to supply current to each of the switches 28, 29 and to the helices 33, 32 by wiring 38, for the return flow of current from the helices. When the pilot turns handle 19 to the left, arm 24 will close switch 29 to establish a current for energizing helix 33 of magnet g to cause the pitch-change means to increase the pitch of the blades and when the handle is turned to the right from its normal position, arm 24 will close switch 28 and establish a circuit for energizing helix 32 of magnet g for causing the pitch-change means to decrease the pitch of the propeller-blades. When the operator releases the handle 19 the switches will be released so they will automatically open and break the helix circuits.

A split-nut 74 with a taper-thread is threaded into bearing 16 to vary the manual force required to either turn or slide the shaft and to frictionally retain the handle 19 and shaft 18 in their assigned positions.

The operation of the pilot's control-device is as follows: When the pilot desires to alter the speed of the engine, he will push or pull handle 19 to shift the throttle and effect the desired corresponding change in speed of the engine and the propeller. When the pilot desires to change the pitch of the propeller-blade in taking off or landing, independently of the throttle-setting or speed of the engine, he will rotate the handle and rock arm 24 in either direction according to whether a decrease or increase of the pitch of the blades is desired. Rotation of the arm 24 to the left will close a circuit through switch 29 and helix 33 which will cause armature 31 to shift rod 62 so it will rotate arm 60 and the ring 56 to shift collar 40 which, through helical slots 55 and pins 57, will move the collar longitudinally to bring the proper worm on the collar into engagement with gear 41 to cause the operation of the pitch-change mechanism to increase the pitch of the blades. When the pilot desires to decrease the pitch of the blades without change in the throttle setting, he will rotate handle 19 to the right to cause arm 24 to close switch 28 and establish a circuit through the helix 32 which will move armature 31 and rod 62 to rotate ring 56 and shift the collar 40 in the opposite direction to engage the other worm with gear 41 and cause the pitch-change mechanism to decrease the pitch.

While the handle 19 and shaft 18 are independently slidable and rotatable for changing the throttle-setting and controlling the pitch-change means independently and relatively of each other, which is necessary in take-offs and landings, of the airplane, the pilot can simultaneously slide and rotate the handle to simultaneously effect a change in the engine-speed and a change in the pitch of the propeller-blades. During the simultaneous rotating and sliding movements of the handle, the extent of the sliding movement will determine the change in the throttle-setting and the direction of the rotary movement and the duration of the period in which it is held in its shifted position, will control the pitch-change.

The invention exemplifies a combined pilot's control-device whereby he can, while grasping it with one hand, independently control the speed of the engine and the pitch of the propeller-blades, thus reducing the number of control-devices required where independent control of the engine-speed and propeller-pitch are provided for. It makes it possible for the pilot, while engaged in manipulating the control-surfaces of the airplane, to change, with a single hand on the handle, both the throttle and the blade-setting. With one hand the pilot can, through the single handle, by movement of the handle in one path, effect changes in the engine-speed and by movement of the same handle in a different path, effect pitch-changes without removing his hand from the handle. With the same handle and hand, the pilot can simultaneously change the engine-speed and propeller-pitch, because without removing his hand from the handle the pilot can both rotate and slide the handle.

While the invention has been exemplified in connection with a propeller comprising two blades and one type of pitch-change mechanism, it is applicable to propellers with a greater number of blades and different forms of pitch-change mechanisms.

The invention is not to be understood as restricted to the details set forth, since these may be modified within the scope of the appended claims, without departing from the spirit and scope of the invention.

Having thus described the invention, what we claim as new and desire to secure by Letters Patent is:

1. In an airplane, the combination with an engine provided with speed-controlling means of a propeller provided with variable pitch blades and means for varying the pitch of the blades, of manually-operable means for shifting the engine control-means to vary the speed of the engine, means for electrically controlling the pitch-variation comprising switch-means, and a pilot's control-device comprising a casing, a shaft rotatably and slidably mounted in the casing, a handle on one end of the shaft, a connection connected to the other end of the shaft for shifting the engine control-means when the shaft is shifted longitudinally, the switch-means being disposed in the casing, an element through which the shift is slidable, connected to the shaft for rotation therewith, for operating the switches in the casing to control the operation of the pitch-changing means, and a handle for manually shifting the shaft.

2. In an airplane, the combination with an engine provided with speed-controlling means of a propeller provided with variable pitch blades and means for varying the pitch of the blades, of manually-operable means for shifting the engine control-means to vary the speed of the engine, means for electrically controlling the pitch-variation comprising a pair of switches, and a pilot's control-device comprising a casing, a shaft rotatably and slidably mounted in the casing, a handle on one end of the shaft, a connection connected to the other end of the shaft, for shifting the engine control-means when the shaft is shifted longitudinally, the switches being disposed in the casing, and an arm through which the shaft is slidable, connected to the shaft for rotation therewith, for operating the switches in the casing to control the operation of the pitch-changing means, and a handle for manually shifting the shaft.

3. In an airplane, the combination with an engine provided with speed-controlling means, a propeller provided with variable pitch blades, and means for shifting the blades to vary their pitch, of means for shifting the speed-controlling means of the engine, electromagnetic means for controlling the operation of the blade-shifting means to increase or decrease the pitch of the blades, a pair of switches for controlling the operation of the electromagnetic means for increasing or decreasing the pitch of the blades, each of said switches being normally held apart by a spring, and a combined control device operable by a single hand of the pilot comprising a handle mounted for concurrent, rotary and sliding movements, means operable by rotary movement of the handle in opposite directions for selectively closing either of the switches, and means operable by sliding movement of the handle for shifting the shifting-means for the speed-controlling means, said switches being closed adjacent to the combined control device.

4. In an airplane, the combination with an engine provided with speed-controlling means, a propeller provided with variable pitch blades, and means for shifting the blades to vary their pitch, of means for shifting the speed-controlling means of the engine, electromagnetic means for controlling the operation of the blade-shifting means to increase or decrease the pitch of the blades, a pair of switches for controlling the operation of the electromagnetic means for increasing or decreasing the pitch of the blades, and a combined control device operable by a single hand of the pilot comprising a handle mounted for concurrent, rotary and sliding movements, means operable by one of said movements of the handle for selectively closing either of the switches, means operable by the other of said movements of the handle for shifting the shifting-means for the speed-controlling means, and releasable means for frictionally holding the handle in its assigned position.

PARKER B. MARTIN.
GEORGE J. BREW.